(12) United States Patent
Rice et al.

(10) Patent No.: US 11,411,691 B2
(45) Date of Patent: Aug. 9, 2022

(54) SYSTEMS AND METHODS FOR ESTIMATING BIT ERROR RATE OF A SIGNAL

(71) Applicant: Ball Aerospace & Technologies Corp., Boulder, CO (US)

(72) Inventors: Jim Rice, Lafayette, CO (US); Courtney Owen, Denver, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 17/378,447

(22) Filed: Jul. 16, 2021

(65) Prior Publication Data
US 2022/0021492 A1    Jan. 20, 2022

Related U.S. Application Data (60) Provisional application No. 63/053,397, filed on Jul. 17, 2020.

(51) Int. Cl.
*H04L 1/20* (2006.01)
*H04L 1/00* (2006.01)

(52) U.S. Cl.
CPC ............ *H04L 1/203* (2013.01); *H04L 1/0045* (2013.01)

(58) Field of Classification Search
CPC ........ H04L 1/203; H04L 1/0045; H04L 25/03
USPC ........................................................ 375/224
See application file for complete search history.

(56) References Cited

U.S. PATENT DOCUMENTS

| | | | | |
|---|---|---|---|---|
| 2008/0199185 | A1* | 8/2008 | Miller | H04B 10/071 398/139 |
| 2011/0002370 | A1* | 1/2011 | Ikedo | G01R 13/0272 375/224 |
| 2015/0318919 | A1* | 11/2015 | Dawe | H04L 1/20 398/16 |
| 2016/0110237 | A1* | 4/2016 | Poulo | G06F 11/076 714/704 |
| 2021/0175968 | A1* | 6/2021 | Wu | H04B 10/0799 |

OTHER PUBLICATIONS

Thomas A. Lindsay (Innovations in BER testers enable fast and accurate eye diagram, eye mask, Q-factor, and jitter measurements) IEEE (Year: 2004).*

* cited by examiner

*Primary Examiner* — Hirdepal Singh
(74) *Attorney, Agent, or Firm* — Sheridan Ross P.C.

(57) ABSTRACT

Methods and systems for generating an estimate of a bit error rate of a signal are provided. Methods and systems include obtaining an eye mask for a receiver, receiving a signal with the receiver, generating an eye mask probability density function of the eye mask, generating an eye diagram probability density function based on the signal, calculating a product of the eye mask probability density function and the eye diagram probability density function, summing the product of the eye mask probability density function and the eye diagram probability density function, and estimating the bit error rate of the signal based on the summing of the product of the eye mask probability density function and the eye diagram probability density function.

20 Claims, 5 Drawing Sheets

SYSTEMS AND METHODS FOR ESTIMATING BIT ERROR RATE OF A SIGNAL

CROSS-REFERENCE TO RELATED APPLICATIONS

This application is related to U.S. Provisional Patent Application Ser. No. 63/053,397, filed Jul. 17, 2020, and entitled "SYSTEMS AND METHODS FOR ESTIMATING BIT ERROR RATE OF A SIGNAL." This related application is hereby incorporated herein by reference

FIELD

The present disclosure is generally related to signal processing and more particularly to estimating the bit error rate of a signal.

BACKGROUND

As usage of communication systems increases, the transmission of signals across buses occurs at increasing speed. The reliability of high quality signals is increasingly important. The electronics industry has used eye diagrams as a way to specify the quality of a serial digital signal traveling through a high speed serial communication bus. Open environment architectures involve eye mask compliance requirements. An eye mask may be used to define an area which should not be traversed by digital signals during a unit interval (UI), corresponding to one clock interval, in order to ensure high quality data recovery. The quality of a high speed digital signal can be quickly determined by using a compliance eye mask overlaid on an eye diagram. A typical mask includes both time and amplitude limits.

When data is transmitted over a channel or data link, the possibility for errors to be introduced into the data decreases the reliability of the data. The bit error rate (BER) of a signal is the number of bit errors per unit time. The BER is a key parameter for measuring the performance of a given data channel. Contemporary methods of determining BER of a received signal are often time consuming and/or require interruption of the data signal. For example, certain contemporary methods of determining BER of a received signal involve using a pseudorandom binary sequence (PBRS) signal which requires interrupting an incoming data signal. Also, certain contemporary methods involve using a first order orthogonal compliance system which does not consider eye diagram and eye mask integration of a full area of a unit interval and does not provide a numerical estimate of BER of a signal.

Localized areas of dense information generation, such as focal plane arrays, create an opportunity for innovation in methods of high bit rate transmission. Qualification of the performance of high bit rate transmission has two main methods: eye diagram analysis and BER measurement. Eye diagram analysis is oversampling of the transmitted bits to provide insight into signal quality while BER is a correlation of transmitted and received information content by digital sampling of the bits by a receiver. There is much interest in the industry for a method to correlate eye diagram analysis with BER, i.e., a numerical estimate of BER from an eye diagram. Accordingly, there is a need to accurately estimate BER of a signal quickly, reliably, and without requiring the interruption of the signal.

SUMMARY

In accordance with embodiments of the present disclosure, systems and methods are provided that enable the estimation of the bit error rate (BER) of a signal.

As described herein, a bit pattern for a signal over a unit interval may be represented as an eye diagram. An eye diagram of a signal and an eye mask representing a state decision boundary of a receiver may both be represented as independent, two-dimensional probability density functions (PDFs). PDFs of an eye diagram or an eye mask may be presented as two-dimensional histograms. A numerical estimate of a bit error rate (BER) of the signal may be determined by calculating the integrated sum of the product of the eye diagram and eye mask PDFs. Full two-dimensional integration of the product of the eye diagram and eye mask PDFs allows for quantitative analysis of an eye diagram and for a comparison of several eye mask concepts including, but not limited to, uniform, Gaussian, and orthogonal.

As described herein, methods and systems may be provided to generate a numerical estimate of a BER of a serial link. BER is a combination of the performance of all the components of the serial link, i.e., transmitter, media, and receiver.

An eye diagram is a waveform folded into a single unit interval. Every bit captured in an eye diagram is traced out by an independent path such that the eye diagram is a statistical representation of the performance of the transmitter and the media. As described herein, an eye diagram may be represented as a PDF confined by a unit interval and maximum amplitude of a sample of the bit population.

IEEE 802.3 specifies that the border of an eye mask represents a $10^{-12}$ BER performance limit of a receiver, but the performance of a receiver in the interior region of the mask is not specified. The present disclosure considers the interior of the eye mask as either a Uniform or a Gaussian PDF.

The present disclosure describes creating a BER PDF by taking the product of an eye diagram PDF and an eye mask PDF. The BER may then be estimated by taking the integrated sum of the BER PDF.

Eye diagrams are often used in conjunction with an eye mask for a qualitative estimate of signal integrity. As described herein, a method of providing a numerical estimate of BER may be implemented by representing both an eye diagram of a signal and an eye mask of a receiver as independent PDFs. The product of the eye diagram PDF and the eye mask PDF may be integrated to estimate the BER for the signal. Contemporary methods of signal processing involve using the concept of an eye diagram as a two-dimensional surface with contours of a constant BER, which demonstrates that the normalization over a unit interval converts an eye diagram to a two-dimensional PDF. Contemporary methods of signal processing also utilize a PDF description of an eye diagram for an estimate of BER while requiring the assumption of an ideal state boundary at the crossing level. The present disclosure involves modelling the eye mask as a two-dimensional PDF. The product of the independent eye diagram and eye mask PDFs may then be integrated in two dimensions. The systems and methods of numerically estimating BER of a signal as described herein allow for a quantitative study of eye diagram interaction with various eye mask.

The present disclosure applies to communication systems and data channels such as radio/wireless links and wired links such as ADSL, Wi-Fi, cellular, IoT links, etc. Addi-

DETAILED DESCRIPTION

Embodiments of the present disclosure provide systems and methods for numerically estimating BER of a signal. Other embodiments provide systems and methods for providing BER estimation feedback to a communication system for use in training artificial intelligence systems of monitoring the system for compliance with one or more standards. The systems and methods can include using eye diagram and eye mask PDFs to estimate the BER of a signal. More particularly, a product of an eye diagram and an eye mask PDF may be determined and summed to estimate the BER of a signal. The systems and methods presented herein may be used to generate an estimate of a BER of a signal in real-time and without requiring interruption of the signal. For example, a PRBS signal may not be required to estimate the BER of the received signal. Such a system or method as described herein provides the benefit of real-time data relating to BER of a signal which may be used to adjust a receiver, such as by adjusting parameters of digital filters of the receiver.

Figure 1:
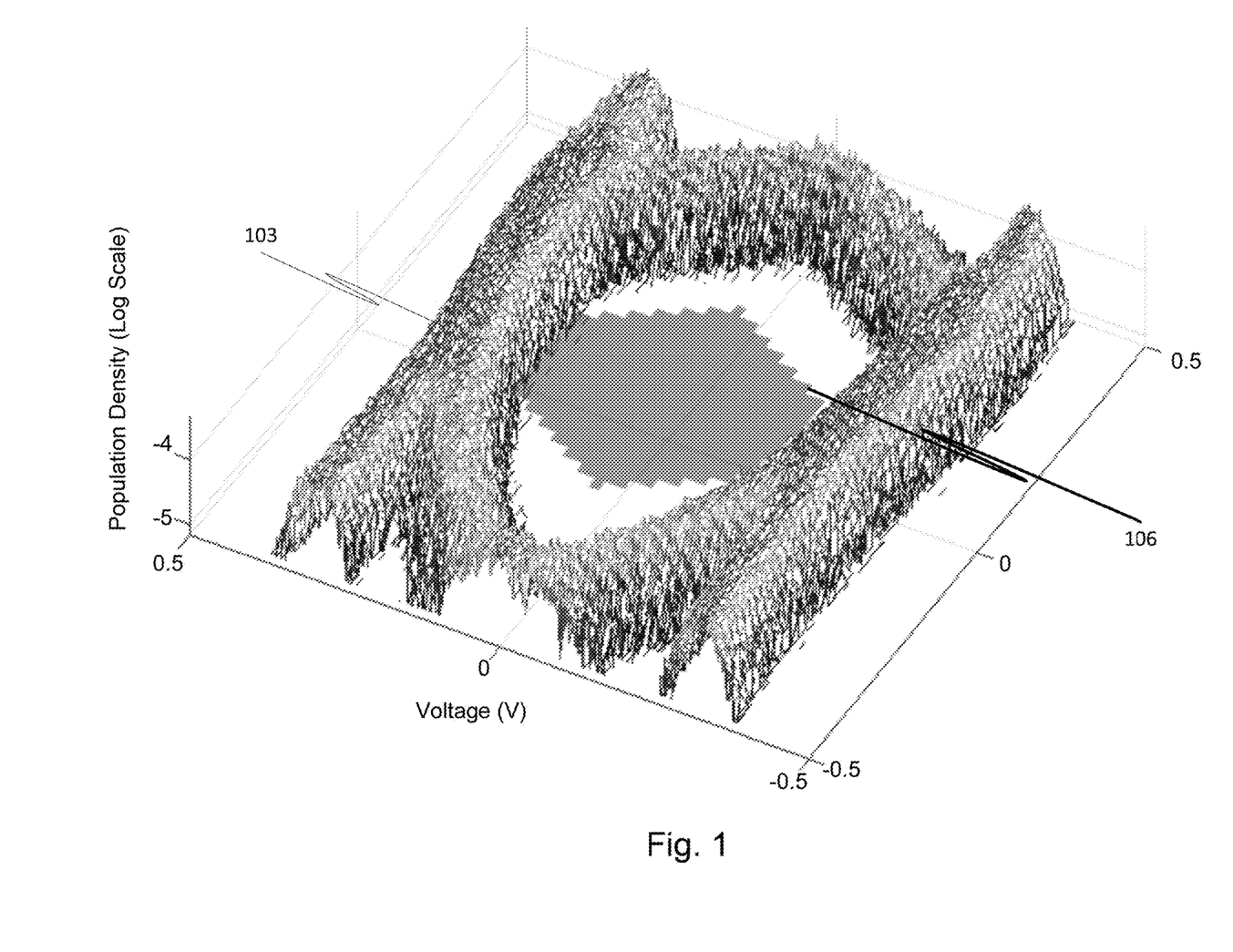
FIG. 1 is an illustration of an eye diagram represented as a PDF in accordance with one or more of the embodiments of the present disclosure.

As illustrated in FIG. 1, an eye diagram may be represented as a PDF 103 confined by a unit interval and maximum amplitude (measured, for example, in Volts).

In FIG. 1, an eye mask PDF 106 is overlayed on the eye diagram PDF 103. The eye diagram PDF 103 illustrated in FIG. 1 is a visualization of a sample of a bit population as received by a receiver. It should be appreciated that any translated signal which can produce an eye diagram may be used in accordance with the embodiments described herein. In some embodiments, an eye diagram may be presented as a population density graph on a logarithmic scale. An over-laid eye mask PDF 106 may be used to define a performance limit of the receiver. While the eye mask PDF 106 of FIG. 1 is shown in a pixelated diamond shape, it should be appreciated an eye mask may be any shape or size. Furthermore, while the eye mask PDF 106 of FIG. 1 appears flat, the eye mask PDF may be in a three-dimensional shape, such as a mesa. In some embodiments, an eye mask PDF may be in two or three dimensions. The interior region of the eye mask may be represented as either a uniform or a Gaussian PDF. The unit interval representation of the eye diagram of FIG. 1 contains two bits, i.e., one bit for upper trace data and one bit for lower trace data. As such, the eye diagram PDF may be multiplied by two to represent a number of statistics per bit.

Figure 2:
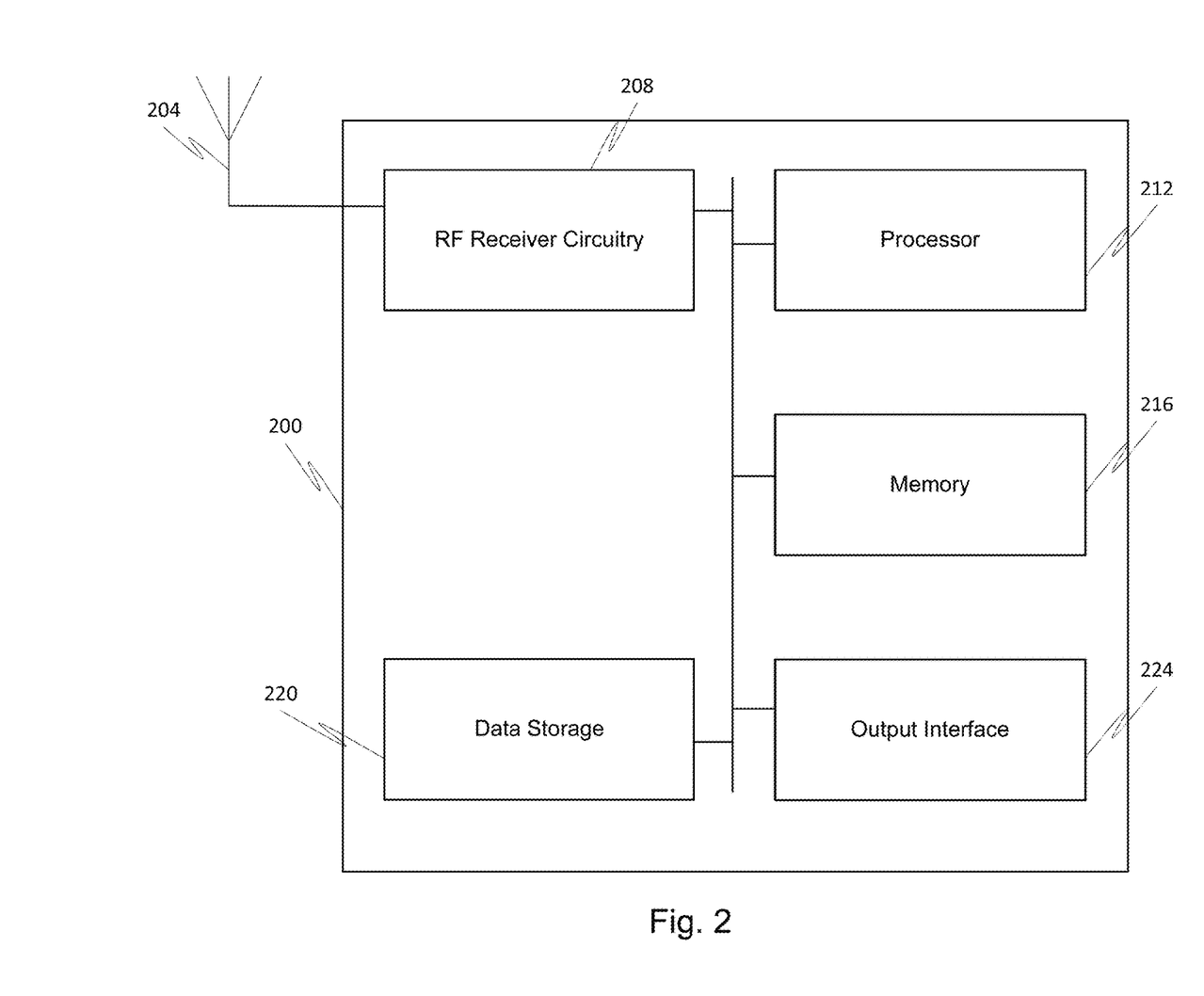
FIG. 2 is an illustration of a system implementing a receiver in accordance with one or more of the embodiments of the present disclosure.

FIG. 2 depicts components of a system 200 implementing a receiver in accordance with embodiments of the present disclosure. As shown, the system 200 can include an antenna 204, RF receiver circuitry 208, a processor 212, memory 216, data storage 220, and an output device or interface 224. The antenna 204 may be configured to receive and/or transmit RF signals, which are provided to the RF receiver circuitry 208. The RF receiver circuitry 208 can include filters, amplifiers, mixers, and the like. As can be appreciated by one of skill in the art after consideration of the present disclosure, the RF receiver circuitry 208 can receive and/or output a raw or noisy time series signal or collection of signals.

A border of an eye mask may represent a BER limit of the performance of a receiver, for example a $10^{-12}$ BER limit. Factors that affect the performance of a receiver are sufficiently numerous that the central limit theorem supports consideration of the interior of the eye mask as a two-dimensional Gaussian PDF as illustrated in FIG. 3B.

Figure 3A:
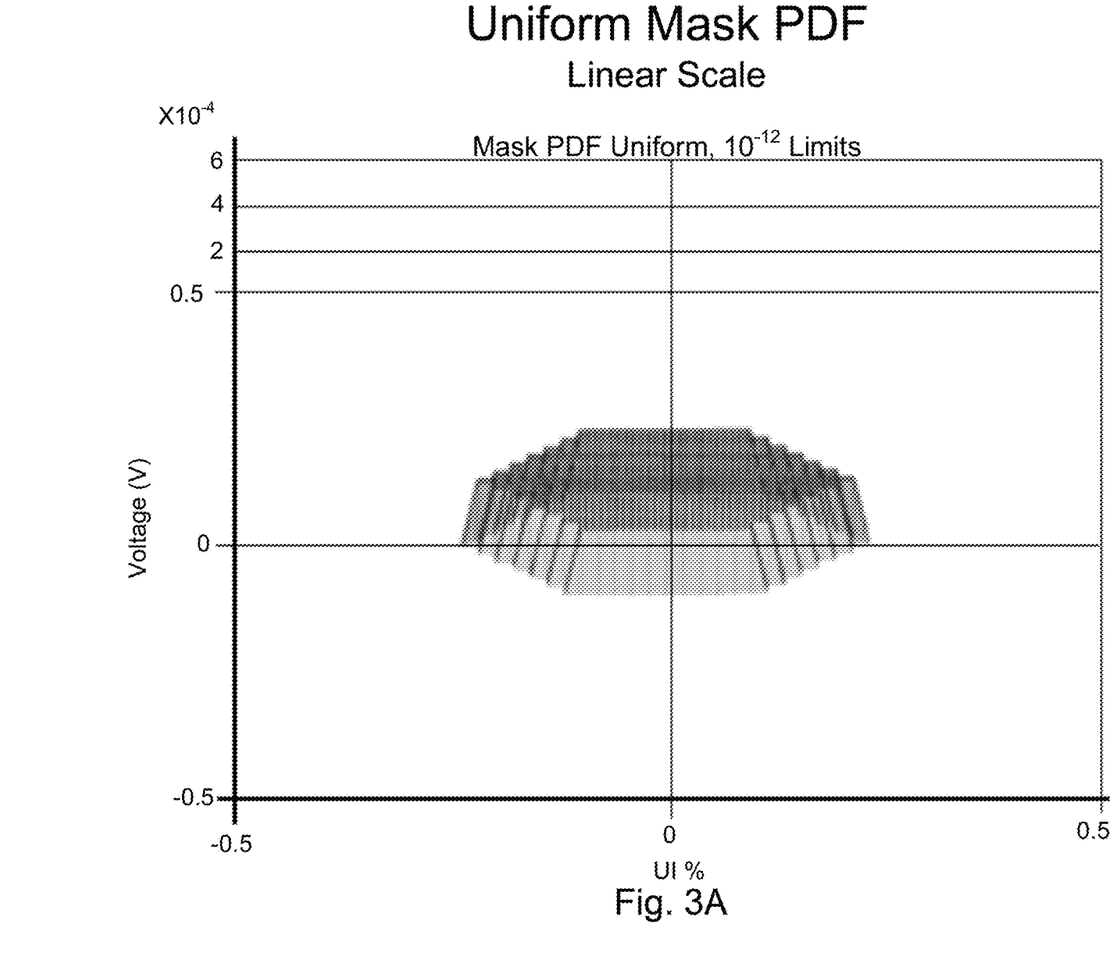
FIG. 3A depicts a uniform mask PDF on a linear scale in accordance with one or more of the embodiments of the present disclosure.
Figure 3B:
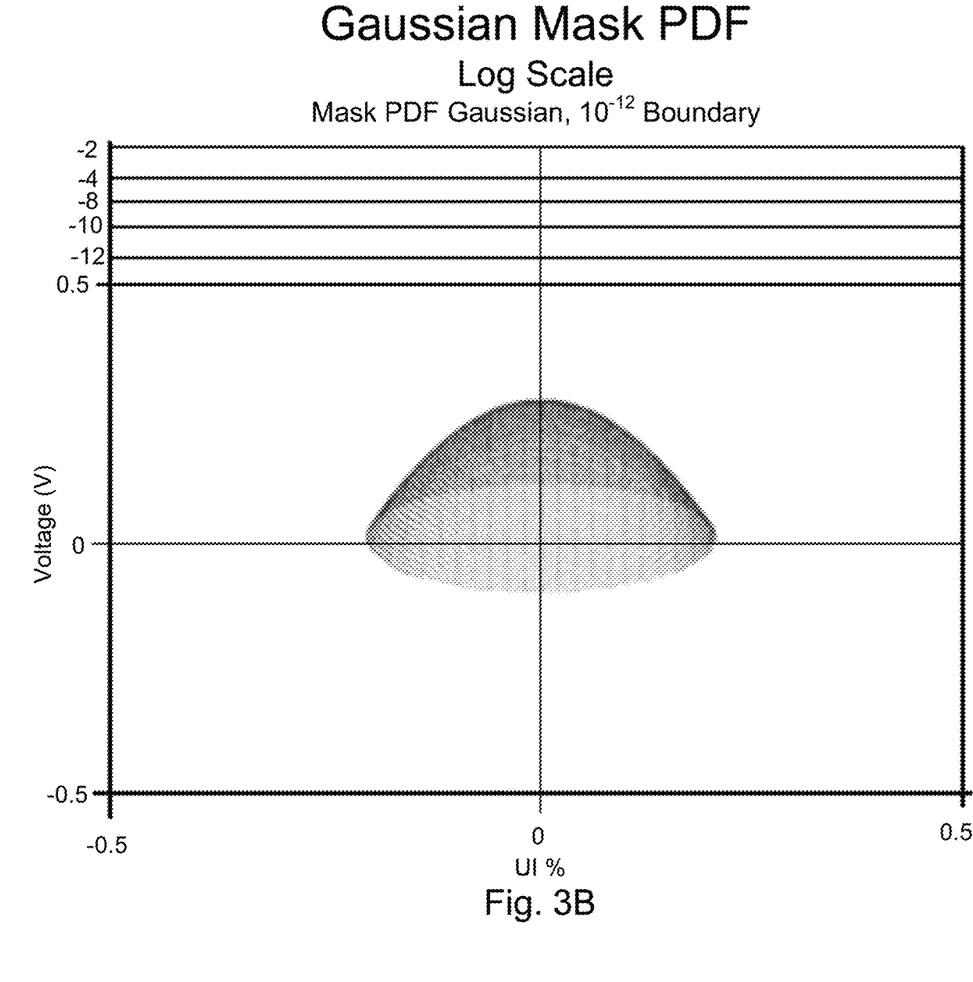
FIG. 3B is an illustration of a Gaussian mask PDF on a logarithmic scale in accordance with one or more of the embodiments of the present disclosure.

FIG. 3A illustrates a uniform eye mask PDF on a linear scale and FIG. 3B illustrates a Gaussian eye mask PDF on a logarithmic scale. The eye masks represent a decision threshold of a receiver. A Gaussian PDF eye mask as illustrated in FIG. 3B is an explicit recognition that bit traces encountering the eye mask near the border of the eye mask have a much lower probability of being perceived in error than traces that cross the center of the eye mask. In some embodiments, a Gaussian eye mask may be used. Gaussian eye masks may be more realistic depending on the types of receiver being used. For example, a receiver may have a Gaussian distribution. Using a system or method as described herein, any eye mask may be of a uniform, orthogonal, Gaussian, or any other shape. In some embodiments, an eye mask may be a single pixel or a pattern comprising plurality of shapes.

In some embodiments, an eye mask may be used to analyze a small portion of a signal. For example, an eye mask may be shaped to test a first quadrant of a signal, or only a small area of the signal, such as a pixel-sized dot. In this way, a determination may be made as to which particular area of a signal is causing a high bit error rate. For example, it may be determined as to how many bit errors are occurring in a center of a signal as compared to at an outer edge of the signal.

The methods and systems described herein involve separating an eye diagram and an eye mask into independent PDFs. Separating the eye diagram and eye mask into separate PDFs enables integration of the eye diagram PDF and the eye mask PDF over an entire unit interval to numerically estimate BER. In some embodiments, using eye diagrams representing less than $10^9$ bits, BER may be, for example, estimated to levels as low as $10^{-20}$. Such methods and systems may be used to quantify an increase in BER due to signal degradation in an eye diagram. It may be numerically shown that BER resulting from a uniform eye mask is not the same as BER resulting from a Gaussian eye mask. Furthermore, it may be shown that reliance upon orthogonal parametrization of an eye diagram (i.e., eye height and eye width) may underestimate BER of a signal by as much as two orders of magnitude, depending on the full two-dimensional eye diagram shape. As such, the systems and methods described herein may be used to achieve a more accurate estimate of BER of a signal for a receiver as compared to conventional systems.

A numerical BER estimate from an eye diagram requires innovation in the representation of the performance of the receiver. In certain embodiments of the present disclosure, a conventional receiver eye mask may be developed into a two-dimensional eye mask probability density function (PDF). In some embodiments, the product of an eye mask PDF and an eye diagram PDF of a transmission may be calculated to generate a BER PDF. The integrated sum of the BER PDF may then be utilized as a numerical estimate of BER of the transmission.

The methods and systems described herein may be particularly useful for compliance studies of open architecture communication systems, analysis of BER effects of two-dimensional eye diagram anomalies, and providing feedback for machine learning for real time adaptation of equalization filters to environment changes that affect media transmission characteristics.

For example, the methods and systems described herein provide a numerical estimate of BER for monitoring compliance of a signal to an open architecture receiver eye mask, while contemporary methods of estimating compliance do not include the receiver performance represented as a full two dimensional probability density function.

Also, the methods and systems described herein provide a benefit in that two-dimensional eye diagram anomalies contribute to the estimated BER. A conventional eye mask does not take in to account a rogue bit or an anomaly relative proximity to the receiver's decision threshold. A PDF approach as described herein correctly attributes a probability of error created by anomalous and rogue bits. As described herein, both an eye diagram and an eye mask are considered as full, two-dimensional fields of elemental probability (2D PDFs). These 2D PDFs capture off-center anomalies of a signal transmission that are not accounted for in contemporary eye diagram compliance methods. Direct BER measurements as used in conjunction with contemporary methods do not provide insight into how performance margin is reduced due to anomalies in the two-dimensional shape of an eye diagram.

Furthermore, methods and systems described herein provide for in-situ estimates of BER on eye diagrams collected from real data as opposed to, for example, a pseudorandom bit sequence (PRBS) signal. Contemporary methods of BER measurement require interruption of mission data and transmission of a PRBS signal for a lengthy time period to make an estimate of BER compliance. The present disclosure enables an estimate of a BER of any data transmitted to be generated, not only a PRBS signal, in real-time. In this way, disruption of mission data to evaluate performance margin of a transmission system can be avoided. Embodiments of the present disclosure provide in-situ and real time estimates of the performance margin of the transmission system.

In certain embodiments of the present disclosure, high information content in eye diagram PDFs and interrogative eye mask PDFs can be used to detect small changes in a transmission system. Conventional BER measurements are low information, often requiring long integration times to detect a single error. Long integration times and limited dynamic range limit conventional BER measurements from being applied in dynamic systems. A measured eye diagram PDF has much higher information content than a conventional BER measurement, and with the eye mask may be adaptable to interrogate an entire eye diagram or different areas of the eye diagram to make real time decisions on the performance of a transmission system.

Systems and methods described herein enable efficient training of machine learning and adaptable filters for transmission systems in dynamic environments. Conventional BER measurements have low information content and are not well suited for feedback in dynamic transmission systems with changing environments or sources of interference. Numerical estimate of BER using PDFs as described herein has higher information content than direct BER measurement which allows for in-situ and real time estimates of transmission system margin and applications in machine learning filter adaptation to changes in transmission environments. Because the systems and methods described herein provide for real time and in-situ measurements, dynamic digital filters can be made available to optimize a transmission system. Feedback may likewise be generated by embodiments of the present disclosure to optimize filters to maintain or improve an estimated BER.

The systems and methods described herein provide for a numerical estimate of BER of a signal from dynamic eye diagram PDFs and any receiver eye masks represented as PDFs. By separating transmission statistics (based on an eye diagram) from receiver statistics (based on an eye mask), the systems and methods described herein enable compliance studies for open architecture transmission systems. Further, the systems and methods described herein enable the consideration of how anomalous eye diagram shapes impact BER.

Figure 4:
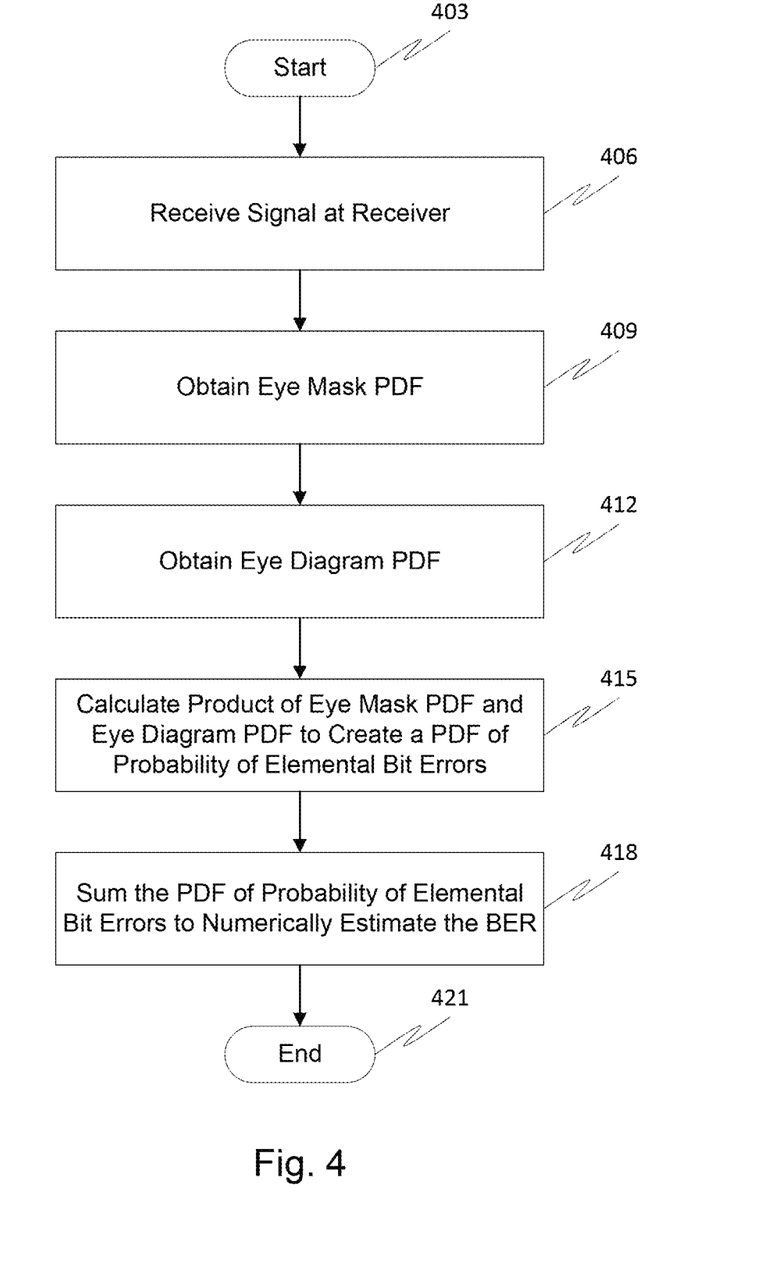
FIG. 4 is a flowchart of a method in accordance with one or more of the embodiments of the present disclosure.

As illustrated in FIG. 4, a method may be implemented to numerically estimate the BER of a signal. At step 403, the method may begin in which a receiver, such as illustrated in FIG. 2, may be used. The receiver may comprise a serial link or bus. At step 406, a signal may be received at the receiver. As the signal is received, samples may be taken of the signal at particular unit intervals. At step 409, an eye mask PDF may be obtained. In some embodiments, an eye mask PDF may be created from an eye mask associated with one or more compliance standards, although it should be appreciated an eye mask PDF of any shape or size may be used. At step 412, an eye diagram PDF may be obtained. An eye diagram PDF may be obtained based on a sampling of the received signal.

At step 415, the product of the eye mask PDF and the eye diagram PDF may be calculated to create a PDF of a probability of elemental bit errors. An eye mask PDF and an eye diagram PDF may contain probabilities on an elemental level. For example:

$$\text{Prob(Bit)} = 2\text{PDF}^{continuous\ Eye} \approx 2\text{PDF}^{sampled\ Eye}$$

$$\text{Prob(Error)} = \text{PDF}^{continuous\ Mask} \approx \text{PDF}^{sampled\ Mask},$$

where $PDF^{continuous\ Eye}$ represents a probability density function of a continuous eye diagram, $PDF^{sampled\ Eye}$ represents a probability density function of a sampled eye diagram, $PDF^{continuous\ Mask}$ represents a probability density function of a continuous eye mask, and $PDF^{sampled\ Mask}$ represents a probability density function of a sampled eye mask. In some embodiments, PDFs of both eye diagrams and eye masks may be digitized or quantized, for example into bins. Once quantized, PDFs become best estimates. In some embodiments, a required number of bins may be set, for example based on processor capabilities, to obtain an acceptable result.

The PDF of bit errors created by taking the product of the eye mask PDF and the eye diagram PDF is an element level map of the probability of bit errors. The PDF of bit errors may be calculated as follows:

$$PDF_{BER} = Prob(\text{Bit} \cap \text{Error}) =$$
$$Prob(\text{Bit}) \times Prob(\text{Error}) = 2PDF^{continuousEye} \times PDF^{continuousMask}.$$

At step 418, the PDF of probability of elemental bit errors may be summed to numerically estimate the BER as follows:

$$BER =$$
$$\int\int_{surface} PDF_{BER} = \int_V \int_{UI} (2PDF^{continuousEye} \times PDF^{continuousMask}) \approx$$
$$\sum_V \sum_{UI} (2PDF^{continuousEye} \times PDF^{continuousMask}),$$

where V represents voltage and UI represents a unit interval.

The numerical estimate of the BER as determined in 418 may be used, for example, to provide feedback to a receiver system. Filters or elements may be adjusted based on the BER estimate. In this way, the systems and methods described herein provide an advantage and benefit when compared to conventional systems. At step 421, the method may end with the BER of the signal estimated in real-time without having interrupted the flow of data.

Embodiments of the present disclosure have application in a variety of communication and/or radio-frequency systems, including but not limited to 5G communications systems, satellite communication systems, radar warning receivers. In some embodiments, systems and methods as described herein may be utilized to adjust filters for a receiver. For example, parameters of one or more digital signals used by a receiver may be adjusted based on eye mask analysis of a signal received by the receiver. Such adjustment may be performed in real-time, due to the benefit provided by the presently described systems and methods, in which interruption of the signal is not required to estimate bit error rate.

Systems and methods as described herein may be used to adjust filters and other aspects of a receiver automatically. For example, in some embodiments, a maximum and/or minimum bit error rate for a receiver may be set. Based on analysis of a signal as described herein, a computer system may be configured to automatically adjust digital filter parameters based on the determined bit error rate.

In some embodiments, a machine learning system may be used to automatically adjust digital filter parameters based on signal analysis. For example, a transmitted signal may be sent through a changing environment. Digital filters can be adapted, using machine learning, to continually optimize performance of the transmission link or receiver over various environments. Machine learning could be implemented using a closed loop feedback mechanism to always keep the bit error rate performance of the receiver at an optimal point. For example, a maximum bit error rate could be set, and digital filters could be fine-tuned to improve bit error rate when the bit error rate exceeds the maximum rate. Machine learning could also be used to determine what parameters to adjust to improve the bit error rate.

In some embodiments, parameters of other elements of a serial link may be adjusted. For example, if a bit error rate of a signal as measured at a receiver is determined to be less than optimal, parameters of a transmitter, a media source of the signal, or other elements may be adjusted.

Embodiments of the present disclosure include a method for generating an estimate of a bit error rate of a signal, the method comprising: obtaining an eye mask for a receiver; receiving a signal with the receiver; generating an eye mask probability density function of the eye mask; generating an eye diagram probability density function based on the signal; calculating a product of the eye mask probability density function and the eye diagram probability density function; summing the product of the eye mask probability density function and the eye diagram probability density function; and estimating the bit error rate of the signal based on the summing of the product of the eye mask probability density function and the eye diagram probability density function.

Aspects of the above method include the method further comprising using the estimated bit error rate of the signal to provide feedback to a system comprising the receiver.

Aspects of the above method include wherein real time estimates of the bit error rate are used as feedback to optimize transmission performance of the system.

Aspects of the above method include wherein the product of the eye mask probability density function and the eye diagram probability density function comprises a bit error rate probability density function.

Aspects of the above method include wherein the eye mask probability density function and the eye diagram probability density function are full two-dimensional fields of elemental probability.

Aspects of the above method include wherein the bit error rate is estimated without interrupting the signal.

Aspects of the above method include further comprising adjusting a parameter of a digital filter based on the estimated bit error rate.

Embodiments include a system comprising: an antenna; a processor; memory; and application programming stored in the memory and executed by the processor, wherein the application programming operates to: obtain an eye mask for a receiver; receive a signal with the receiver; generate an eye mask probability density function of the eye mask; generate an eye diagram probability density function based on the signal; calculate a product of the eye mask probability density function and the eye diagram probability density function; sum the product of the eye mask probability density function and the eye diagram probability density function; and estimate a bit error rate of the signal based on the summing of the product of the eye mask probability density function and the eye diagram probability density function.

Aspects of the above system include wherein the application programming further operates to use the estimated bit error rate of the signal to provide feedback to a second system comprising the receiver.

Aspects of the above system include wherein real time estimates of the bit error rate are used as feedback to optimize transmission performance of the system.

Aspects of the above system include wherein the product of the eye mask probability density function and the eye diagram probability density function comprises a bit error rate probability density function.

Aspects of the above system include wherein the eye mask probability density function and the eye diagram probability density function are full two-dimensional fields of elemental probability.

Aspects of the above system include wherein the bit error rate is estimated without interrupting the signal.

Aspects of the above system include wherein the application programming further operates to adjust a parameter of a digital filter based on the estimated bit error rate.

Embodiments include a computer program product comprising: a computer-readable hardware storage device having thereon computer-executable instructions executable by a processor of a computing system, wherein the instructions, when executed by the processor, cause the processor to: obtain an eye mask for a receiver; receive a signal with the receiver; generate an eye mask probability density function of the eye mask; generate an eye diagram probability density function based on the signal; calculate a product of the eye mask probability density function and the eye diagram probability density function; sum the product of the eye mask probability density function and the eye diagram probability density function; and estimate a bit error rate of the signal based on the summing of the product of the eye mask probability density function and the eye diagram probability density function.

Aspects of the above computer program product include wherein the application programming further operates to use the estimated bit error rate of the signal to provide feedback to a second system comprising the receiver.

Aspects of the above computer program product include wherein real time estimates of the bit error rate are used as feedback to optimize transmission performance of the system.

Aspects of the above computer program product include wherein the product of the eye mask probability density function and the eye diagram probability density function comprises a bit error rate probability density function.

Aspects of the above computer program product include wherein the eye mask probability density function and the eye diagram probability density function are full two-dimensional fields of elemental probability.

Aspects of the above computer program product include wherein the bit error rate is estimated without interrupting the signal.

Aspects of the above computer program product include wherein the application programming further operates to adjust a parameter of a digital filter based on the estimated bit error rate.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for generating an estimate of a bit error rate of a signal, the method comprising:
    obtaining an eye mask for a receiver;
    receiving a signal with the receiver;
    generating an eye mask probability density function of the eye mask;
    generating an eye diagram probability density function based on the signal;
    calculating a product of the eye mask probability density function and the eye diagram probability density function;
    summing the product of the eye mask probability density function and the eye diagram probability density function; and
    estimating the bit error rate of the signal based on the summing of the product of the eye mask probability density function and the eye diagram probability density function.

2. The method of claim 1, further comprising using the estimated bit error rate of the signal to provide feedback to a system comprising the receiver.

3. The method of claim 2, wherein real time estimates of the bit error rate are used as feedback to optimize transmission performance of the system.

4. The method of claim 1, wherein the product of the eye mask probability density function and the eye diagram probability density function comprises a bit error rate probability density function.

5. The method of claim 1, wherein the eye mask probability density function and the eye diagram probability density function are full two-dimensional fields of elemental probability.

6. The method of claim 1, wherein the bit error rate is estimated without interrupting the signal.

7. The method of claim 1, further comprising adjusting a parameter of a digital filter based on the estimated bit error rate.

8. A system comprising:
    an antenna;
    a processor;
    memory; and
    application programming stored in the memory and executed by the processor, wherein the application programming operates to:
        obtain an eye mask for a receiver;
        receive a signal with the receiver;
        generate an eye mask probability density function of the eye mask;
        generate an eye diagram probability density function based on the signal;
        calculate a product of the eye mask probability density function and the eye diagram probability density function;
        sum the product of the eye mask probability density function and the eye diagram probability density function; and
        estimate a bit error rate of the signal based on the summing of the product of the eye mask probability density function and the eye diagram probability density function.

9. The system of claim 8, wherein the application programming further operates to use the estimated bit error rate of the signal to provide feedback to a second system comprising the receiver.

10. The system of claim 9, wherein real time estimates of the bit error rate are used as feedback to optimize transmission performance of the system.

11. The system of claim 8, wherein the product of the eye mask probability density function and the eye diagram probability density function comprises a bit error rate probability density function.

12. The system of claim 8, wherein the eye mask probability density function and the eye diagram probability density function are full two-dimensional fields of elemental probability.

13. The system of claim 8, wherein the bit error rate is estimated without interrupting the signal.

14. The system of claim 8, wherein the application programming further operates to adjust a parameter of a digital filter based on the estimated bit error rate.

15. A computer program product comprising:
a computer-readable hardware storage device having thereon computer-executable instructions executable by a processor of a computing system, wherein the instructions, when executed by the processor, cause the processor to:
obtain an eye mask for a receiver;
receive a signal with the receiver;
generate an eye mask probability density function of the eye mask;
generate an eye diagram probability density function based on the signal;
calculate a product of the eye mask probability density function and the eye diagram probability density function;
sum the product of the eye mask probability density function and the eye diagram probability density function; and
estimate a bit error rate of the signal based on the summing of the product of the eye mask probability density function and the eye diagram probability density function.

16. The computer program product of claim 15, further comprising using the estimated bit error rate of the signal to provide feedback to a system comprising the receiver.

17. The of computer program product claim 16, wherein real time estimates of the bit error rate are used as feedback to optimize transmission performance of the system.

18. The computer program product of claim 15, wherein the product of the eye mask probability density function and the eye diagram probability density function comprises a bit error rate probability density function.

19. The computer program product of claim 15, wherein the eye mask probability density function and the eye diagram probability density function are full two-dimensional fields of elemental probability.

20. The computer program product of claim 15, wherein the bit error rate is estimated without interrupting the signal.

* * * * *